Feb. 25, 1941.    C. A. DIES    2,233,247
SAFETYPIN
Filed Feb. 15, 1940
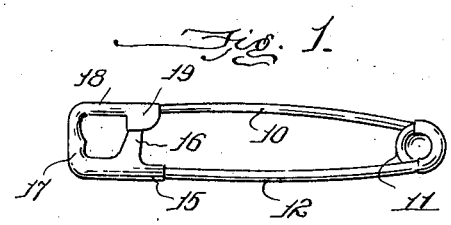
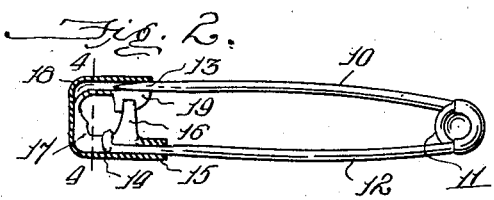 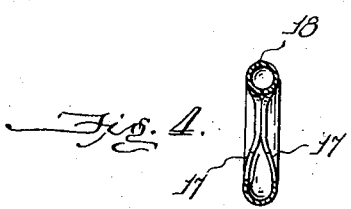
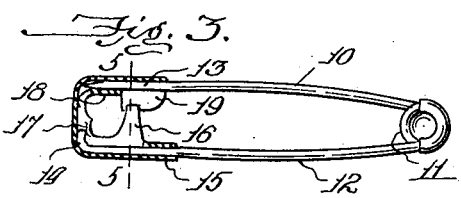 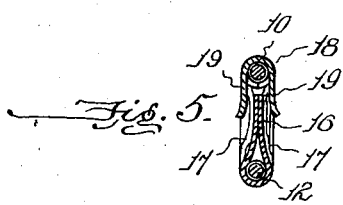
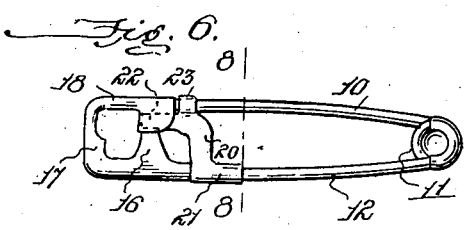
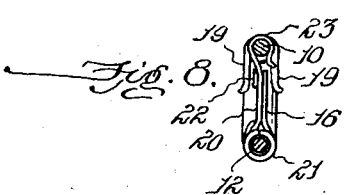
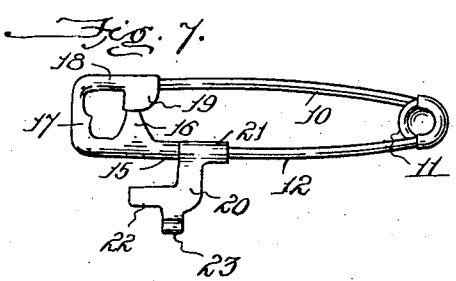
Inventor:
Charles A. Dies.
By — *[signature]*
Attorney Patented Feb. 25, 1941

2,233,247

UNITED STATES PATENT OFFICE 2,233,247

SAFETYPIN

Charles A. Dies, Aurora, Ill., assignor of one-half to Arthur Clifford Pikop, Aurora, Ill.

Application February 15, 1940, Serial No. 319,153

1 Claim. (Cl. 24—158)

My invention is an improvement in safety pins of that type in which the pin is attached at one end to a companion member, and the latter provided at its outer end with a guard or keeper with which the point of the pin is engaged for connecting the parts of the safety pin together.

In the use of safety pins of this general character for fastening clothes and other material the point of the pin sometimes becomes disengaged from the guard resulting not only in the pin becoming unfastened from the clothes but also a likelihood that the unprotected point of the pin will prick the skin of the wearer—an unfortunate circumstance especially when the safety pin is used for fastening the wearing apparel of babies and children.

It is the main purpose of my invention, therefore, to provide an additional security against the point of the pin becoming accidentally disengaged from the guard by effecting a more intimate or positive engagement of the parts through the instrumentality of locking means associated with the guard in such a manner as not to interfere with the usual operation of the safety pin.

With this principal object in view I contemplate constructing the guard so that it will be slidable on the companion members of the safety pin, whereby in one position the point may be easily disconnected and in the other position said point will be more securely engaged to overcome its accidental disengagement.

My invention therefore contemplates a construction of guard or keeper which is slidable on the member supporting the same and on the outer end of the pin when the latter is in engagement with the guard, and for additional security a slidable metal piece is provided to produce a double lock; all as hereinafter fully described and specifically pointed out in the appended claim.

In the drawing:

Figure 1 is a view illustrating the preferred form of construction.

Figs. 2 and 3 are views, partly in section, showing the different positions of the slidable guard.

Fig. 4 is a sectional view on the line 4—4 of Fig. 2.

Fig. 5 is a sectional view on the line 5—5 of Fig. 3.

Figs. 6 and 7 are views illustrating a modification to provide a double lock for the point of the pin, and Fig. 8 is a sectional view on the line 8—8 of Fig. 6.

Like numerals of reference indicate like parts in the several views of the drawing.

My invention is applied to an improvement of the guard, and consequently the other parts of the safety pin are of ordinary construction; that is, the pin 10 of spring wire is connected at its inner end by coil 11 to a spring wire companion member 12 having at its outer end the guard which receives and retains the point of the pin in connection therewith, but in the present instance the outer end of the member carrying the guard is formed with a bent end 14 to cooperate with the improved construction of guard.

In carrying out my invention the guard is slidable on the supporting member 12 and on the outer end portion of the pin when the latter is in engagement therewith. For this purpose the inner end of the lower portion of the guard is bent over the supporting member 12 in the form of a collar 15, for slidable connection therewith, and in the rear of the usual tongue 16 the side walls 17, 17 are contracted to grip the bent end 14 of the supporting member 12 when the guard is slid forwardly thereon as shown in Fig. 3 of the drawing, the outward movement being limited by contact of the bent end with the tongue. This arrangement provides for movement of the guard so that the pin may also intimately engage a recess 18 in the rear of the spaced apart lips 19, 19, said recess being formed by bending the upper ends of the side walls of the guard, it being noted that when the guard is slid outwardly the point of the pin is between the lips or in position to be disengaged.

For additional security, or for providing a double lock, to prevent the pin from becoming accidentally disengaged from the guard, I employ a retaining element shown in Figs. 6 to 8 of the drawing, consisting of a metal piece or plate 20 connected to the member 12 of the safety pin by a collar 21, and having a projecting tongue 22 adapted to be passed into the space between the lips 19, 19 to prevent dislodgment of the outer end of the pin, and although this retaining element may be held in place by the clothing or material with which the pin is in engagement when in use, I prefer to bend the outer end of the same to form a clip 23 adapted to be sprung over the pin when the latter is in engagement with the guard. Although the slidable locking element 20 is effective in connection with the slidable guard for more firmly and securely connecting the parts of the safety pin when fastened to the clothing, it is obvious that said slidable element may be used in association with a guard rigidly secured to the supporting member in the usual manner. However, the provision of the slidable guard of special construction and additional locking element forms a safety pin or clasp that will be securely held in place without danger of the point becoming accidentally disconnected from the guard.

The operation of my improved construction of safety pin in its application to clothing will be readily understood from the foregoing description in connection with the accompanying drawing, for when the guard is slid outwardly the point of the pin is in line with the lips to be disengaged in the usual manner for fastening the pin in the clothing, and when the point of the pin is engaged between the lips forward movement of the guard will force the point of the pin into the recess and also force the bent end of the supporting member 12 between the contracted side walls for gripping action of the latter thereon. During this operation the locking plate 20 is disconnected from the pin, and after the engagement of the guard with the point of the pin and bent end of the supporting member said locking plate is swung into engagement with the body of the pin and then slid outwardly so that the tongue 22 thereof will enter the guard between the lips 19, 19 and tongue 16.

I claim:

A safety pin comprising spaced apart substantially parallel spring members connected together at one end in forming the penetrating pin and companion supporting member, the outer end of the supporting member being bent inwardly towards the pin to provide a short projection or catch element, in association with a U-shape sheet metal guard slidable on the supporting member to receive and protect the point of the pin in the closed or locked position of the safety pin, that portion or member of the U-shape guard slidably connected to the supporting member having contracted sides at its outer end for frictional engagement of the catch element therewith, and the other portion or member having a pair of lips between which the point of the pin is received in opening and closing the pin with a recess beyond the same to confine the pin-point when the guard is moved to locked position.

CHARLES A. DIES.